(12) United States Patent
Estes et al.

(10) Patent No.: US 10,433,143 B2
(45) Date of Patent: *Oct. 1, 2019

(54) SYSTEMS AND METHODS FOR NOTIFYING LAW ENFORCEMENT OFFICERS OF ARMED INTRUDER SITUATIONS#

(71) Applicant: Guard911 LLC, Collinsville, IL (US)

(72) Inventors: Brian Lee Estes, Collinsville, IL (US); Nathan John McVicker, Collinsville, IL (US); Thomas Michel Swip, Jr., Collinsville, IL (US); Michael Ray Snyders, Collinsville, IL (US)

(73) Assignee: Guard911 LLC, Collinsville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/999,367

(22) Filed: Apr. 28, 2016

(65) Prior Publication Data

US 2017/0318444 A1 Nov. 2, 2017
US 2019/0261144 A9 Aug. 22, 2019

Related U.S. Application Data

(63) Continuation of application No. 14/016,908, filed on Sep. 13, 2013, now abandoned.

(51) Int. Cl.
*H04W 4/90* (2018.01)
*H04M 3/51* (2006.01)
(Continued)

(52) U.S. Cl.
CPC .......... *H04W 4/90* (2018.02); *H04M 3/5116* (2013.01); *H04W 4/021* (2013.01); *H04W 4/08* (2013.01);
(Continued)

(58) Field of Classification Search
CPC ......... H04W 4/22; H04W 64/00; H04W 4/02; H04W 76/007; H04W 28/04; H04W 88/08; H04W 24/00; H04W 4/90; H04W 4/021; H04W 4/08; H04M 3/5116; H04M 2203/205; H04M 2242/04
See application file for complete search history.

(56) References Cited

U.S. PATENT DOCUMENTS 7,468,663 B1 * 12/2008 Rufolo, Jr. ....... G08B 13/19641
340/540
7,518,500 B2 * 4/2009 Aninye ............... G07C 9/00111
340/506

(Continued)

*Primary Examiner* — Christopher M Brandt
(74) *Attorney, Agent, or Firm* — Robert N Lyman LLC

(57) ABSTRACT

A computer-implemented method executed by one or more computer servers includes receiving a notification from a first communication device. The notification indicates an armed intruder within a first stationary geofence. The method further includes determining whether one or more of a first plurality of communication devices are within a second stationary geofence different than the first stationary geofence, and in response to the notification, providing an emergency alert to the communication device(s) determined to be within the second stationary geofence. Other example computer-implemented methods, communication devices including software applications, and systems for notifying one or more LEOs of an armed intruder by a premises personnel associated with a premises are also disclosed.

19 Claims, 11 Drawing Sheets

(51) Int. Cl.
*H04W 4/021* (2018.01)
*H04W 4/08* (2009.01)

(52) U.S. Cl.
CPC .. *H04M 2203/205* (2013.01); *H04M 2242/04* (2013.01)

(56) References Cited

U.S. PATENT DOCUMENTS

| | | | | |
|---|---|---|---|---|
| 8,233,943 | B1* | 7/2012 | Othmer | G06F 9/542 379/207.16 |
| 8,521,186 | B2* | 8/2013 | Fitchett | H04L 29/06027 455/404.2 |
| 2005/0111630 | A1* | 5/2005 | Potorny | H04Q 3/0045 379/45 |
| 2006/0109113 | A1* | 5/2006 | Reyes | G08B 7/06 340/541 |
| 2008/0088437 | A1* | 4/2008 | Aninye | G07C 9/00111 340/539.13 |
| 2009/0021398 | A1* | 1/2009 | Thompson | G08B 21/22 340/990 |
| 2009/0156160 | A1* | 6/2009 | Evans | G06Q 50/01 455/404.2 |
| 2010/0017126 | A1* | 1/2010 | Holcman | G08B 21/0227 701/300 |
| 2010/0315508 | A1* | 12/2010 | Lee | G08B 13/19608 348/154 |
| 2011/0115623 | A1* | 5/2011 | Gnanasekaran | G08B 21/02 340/539.26 |
| 2011/0117878 | A1* | 5/2011 | Barash | H04W 4/90 455/404.2 |
| 2011/0176006 | A1* | 7/2011 | Fan | G08B 13/19645 348/153 |
| 2012/0190295 | A1* | 7/2012 | Kim | G06Q 10/06 455/3.01 |
| 2012/0220259 | A1* | 8/2012 | Sennett | H04W 4/90 455/404.2 |
| 2013/0157612 | A1* | 6/2013 | Cordero | H04W 4/90 455/404.2 |
| 2014/0057648 | A1* | 2/2014 | Lyman | H04W 4/021 455/456.1 |
| 2014/0139681 | A1* | 5/2014 | Jones, Jr. | G08B 13/19645 348/159 |
| 2014/0365709 | A1* | 12/2014 | Strauss | G06Q 50/26 711/103 |
| 2014/0368643 | A1* | 12/2014 | Siegel | G08B 13/19695 348/143 |
| 2015/0038109 | A1* | 2/2015 | Salahshour | H04W 4/90 455/404.2 |
| 2015/0065081 | A1* | 3/2015 | Estes | H04W 4/021 455/404.2 |
| 2017/0085624 | A1* | 3/2017 | Mukherjee | H04L 43/0817 |

* cited by examiner

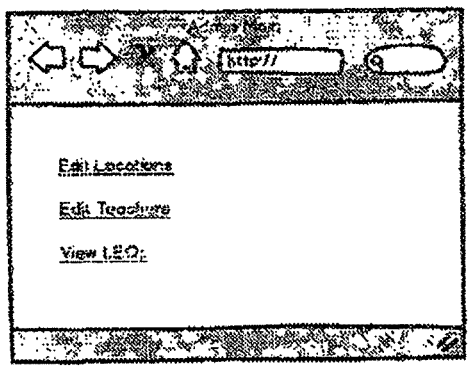

Fig. 10A

Teacher List

Select Location... ▼   View Location    [Add Teacher]

| Teacher | Authorization Code | Date Activated | Outside | Edit |
|---|---|---|---|---|
| Sue Smith | HSAOSDIHOH12348737 | 8/12/13 | x | x |
| Bob Jones | KJASDHKJASHD987897 | 8/11/13 |  | x |
| Sally White | SAEOIYNWEKQL721723 | 8/10/13 | x | x |

Add a Teacher to SIUE

First Name [    ]      [Save]
Last Name [    ]

☐ Send Notification if OUTSIDE Geofence

Activation Code: NJSADUY213HJH1123DFS   [Regenerate]
Activated: 8/12/13   [Inactivate]
Inactivated: 8/14/13

1002

SYSTEMS AND METHODS FOR NOTIFYING LAW ENFORCEMENT OFFICERS OF ARMED INTRUDER SITUATIONS#

FIELD

The present disclosure relates to systems and methods for notifying law enforcement officers (LEDs) of armed intruder situations.

BACKGROUND

This section provides background information related to the present disclosure which is not necessarily prior art.

During an armed intruder situation, an individual may notify emergency services (e.g., by dialing 911). Emergency services then contact an appropriate agency (e.g., a police station) at which time the agency contacts various LEOs who may then respond (if available) the armed intruder situation.

Sometimes an individual may develop a specific network of friends, neighbors, family members, etc. that are contacted by an assistance system when the individual sends a notification indicating an emergency. In some instances, specific members of the network may be contacted depending on the type of emergency, the location of the emergency, etc.

SUMMARY

This section provides a general summary of the disclosure, and is not a comprehensive disclosure of its full scope or all of its features.

According to one aspect of the present disclosure, a computer-implemented method executed by one or more computer servers includes receiving a notification from a first communication device. The notification indicates an armed intruder within a first stationary geofence. The method further includes determining whether one or more of a first plurality of communication devices are within a second stationary geofence different than the first stationary geofence, and in response to the notification, providing an emergency alert to the communication device(s) determined to be within the second stationary geofence.

According to another aspect of the present disclosure, a computer-implemented method executed by one or more computer servers includes receiving a notification from a first communication device. The notification indicates an armed intruder within one of a plurality of protection zones. The method further includes determining whether one or more of a first plurality of communication devices are within a stationary geofence associated with said one of the plurality of protection zones, and in response to the notification, providing an emergency alert to the communication device(s) determined to be within the stationary geofence associated with said one of the plurality of protection zones.

According to yet another aspect of the present disclosure, a communication device includes memory, one or more processors, and a software application stored in the memory for execution by the one or more processors. The software application is configured to send a notification indicating an armed intruder within the stationary geofence to a remote server in response to user input when the communication device is within a stationary geofence, and not send the notification to the remote server in response to the user input when the communication device is outside the stationary geofence.

According to another aspect of the present disclosure, a system for notifying one or more LEOs of an armed intruder by personnel associated with a premises is disclosed. The system includes one or more computer servers, a first plurality of communication devices, and a second plurality of communication devices. Each of the premises personnel has one of the first plurality of communication devices and each of the LEOs has one of the second plurality of communication devices. Each of the first plurality of communication devices includes memory, one or more processors, and a software application stored in the memory for execution by the one or more processors. Each of the first plurality of communication devices is configured to send a notification via its software application to the one or more computer servers. The notification indicates the armed intruder is within the first stationary geofence. Each of the second plurality of communication devices includes memory, one or more processors, and a software application stored in the memory for execution by the one or more processors. Each of the second plurality of communication devices is configured to receive an emergency alert from the one or more computer servers. The emergency alert corresponds to the notification indicating the armed intruder within the first stationary geofence. The one or more computer servers are configured to determine whether one or more of the second plurality of communication devices are within a second stationary geofence different than the first stationary geofence, and send the emergency alert to the communication device(s) determined to be within the second stationary geofence in response to a notification sent by one of the first plurality of communication devices.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 is a screen shot of a user interface allowing one or more system administrators to edit the location of a stationary geofence, edit a list of school personnel allowed to use a software application, and view the LEOs in an LEO network according to still another example embodiment.

FIG. 9A is a screen shot of a user interface allowing one or more system administrators to view a location list of stationary geofences according to another example embodiment.

FIG. 9B is a screen shot of a user interface allowing one or more system administrators and/or school administrators to edit the location list of a stationary geofence according to another example embodiment.

FIGS. 10A-10B are screen shots of user interfaces allowing one or more system administrators and/or school administrators to view and/or edit school personnel allowed to use a software application according to another example embodiment.

Corresponding reference numerals indicate corresponding parts or features throughout the several views of the drawings.

DETAILED DESCRIPTION

Figure 1:
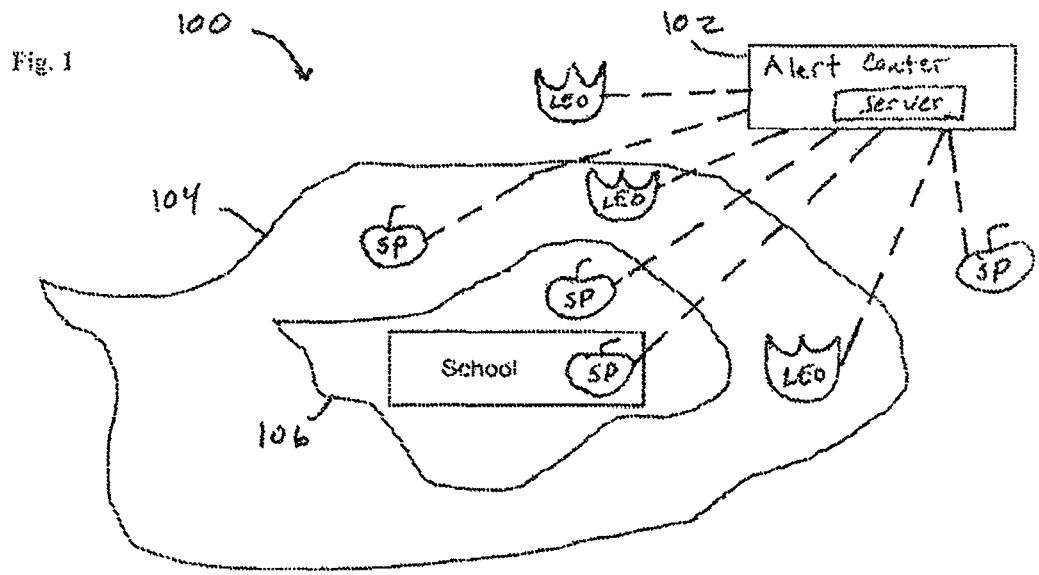
FIG. 1 is a diagram of a system including an alert center and two stationary geofences encompassing a school according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first" "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A system for notifying one or more law enforcement officers (LEDs) of an armed intruder by a school personnel associated with a premises according to one example embodiment of the present disclosure is illustrated in FIG. 1 and indicated generally by reference number 100. As shown in FIG. 1, the system 100 includes an alert center 102, stationary geofences 104, 106, multiple LEOs, and multiple school personnel SP. In the example of FIG. 1, the stationary geofence 104 is different than the stationary geofences 106 (which is also referred to herein as a protection zone). The stationary geofence 104 encompasses the stationary geofence 106 and both geofences 104, 106 encompass a school.

As shown in FIG. 1, two LEOs are within the stationary geofence 104 and one LEO is outside the stationary geofence 104. Additionally, two school personnel SP are within the stationary geofence 106 and two school personnel SP are outside the stationary geofence 106.

The alert center 102 is configured to communicate with the LEOs and the school personnel SP using a wired and/or wireless network(s). For example, each of the LEOs and each of the school personnel SP may have a communication device configured to communicate with the alert center 102. Each of the LEO communication devices includes a LEO software application and each of the school personnel communication devices includes a school personnel software application.

The alert center 102 may receive a notification indicating an armed intruder within the stationary geofence 106 from school personnel SP. The alert center 102 may further determine whether any LEOs are within the stationary geofence 104 and, in response to the notification, provide (e.g., send) an emergency alert to each of the LEOs determined to be within the stationary geofence 104.

The alert center 102 may provide the emergency alert to any LEOs determined to be within the stationary geofence 104 irrespective of whether these LEOs are on-duty, off-duty, retired, etc. By determining whether any LEOs are within the stationary geofence 104 and then providing the emergency alert to the LEOs within the stationary geofence 104, the LEO response time to an armed intruder situation may be markedly reduced.

For example, if an LEO is determined to be within the stationary geofence 104 based on the location of the LEO's communication device, the alert center 102 provides an emergency alert to notify the LEO that an armed intruder situation is occurring relatively close to the LEO. In turn, the LEO may approach the school thereby reducing the response time. In some cases, by determining whether any LEOs are within a stationary geofence and then providing the emergency alert to identified LEOs within that stationary geofence, the response time may be reduced from an average time of about eighteen (18) minutes for on-duty LEOs following typical protocol.

In some embodiments, the alert center 102 may determine whether the school personnel SP is within the stationary geofence 106. The alert center 102 may then determine whether any LEOs are within the stationary geofence 104 and/or provide the emergency alert to identified LEOs only if the school personnel SP is within the stationary geofence 106. For example, the alert center 102 may receive a ping from the school personnel's communication device and/or the LEO's communication device indicating a location of the communication device. In this way, the alert center 102 can restrict sending emergency alerts to LEOs when the school personnel SP is not within the stationary geofence 106 (e.g., at the school).

Additionally and/or alternatively, the school personnel's communication device may be configured (e.g., via the school personnel software application) to send the notification when it is within the stationary geofence 106 and not send the notification when it is outside the stationary geofence 106. Thus, in the example of FIG. 1, the two school personnel SP within the stationary geofence 106 may be permitted to send notification(s) while the two school personnel SP outside the stationary geofence 106 may not send notification(s).

For example, school personnel SP may select an input on the school personnel software application to send the notification as explained above. The school personnel's communication device may be configured to only send the notification in response to user input when the communication device is within the stationary geofence 106. When the communication device is outside the stationary geofence 106, however, the communication device will not send the notification in response to the user input. The school personnel software application may utilize a global positioning system or any other suitable location tracking system of the communication device to determine its location relative to the stationary geofence 106.

In some embodiments, the alert center 102 may provide an emergency alert to the school personnel SP determined to be within the stationary geofence 106 in response to receiving the notification indicating the armed intruder. For example, if one of the school personnel SP within the stationary geofence 106 notifies the alert center 102 of an armed intruder situation, the alert center 102 can determine that another school personnel SP is within the stationary geofence 106. The alert center 102 can then provide an emergency alert to the other school personnel SP indicating that an armed intruder situation may be occurring within the stationary geofence 106.

Additionally, the alert center 102 may provide the emergency alert to the school personnel SP outside the stationary geofence 106. For example, the alert center 102 may provide the emergency alert to defined individuals (e.g., principals, deans, presidents, etc.). The school personnel SP who may receive the emergency alert outside the stationary geofence 106 may be selected during the initial setup of the system, added and/or removed after the initial setup, etc.

Figure 6:
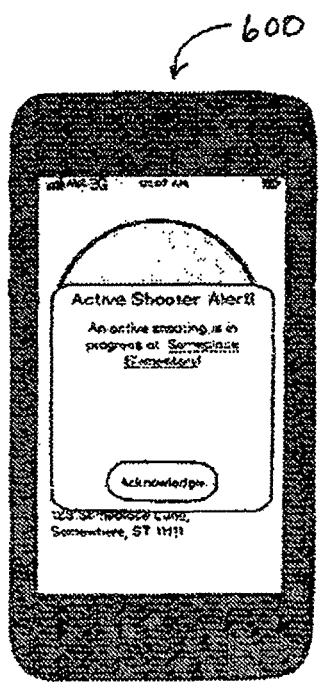
FIG. 6 is a screen shot of a school personnel software application displaying an emergency alert according to another example embodiment.

FIG. 6 illustrates an example screen shot 600 of a school personnel software application. As shown in FIG. 6, the software application displays an emergency alert as explained above indicating an armed intruder situation at the school associated with the school personnel SP.

Referring back to FIG. 1, the alert center 102 may receive an acknowledgement of an emergency alert from any LEO determined to be within the stationary geofence 104. This acknowledgement confirms the LEO received the emergency alert and intends to approach the school. For example, an LEO may select an input on the LEO software application to send the acknowledgement to the alert center 102 indicating receipt of the emergency alert. FIG. 5H illustrates one example screen shot 514 of the LEO software application notifying an LEO of an emergency alert and an input on the LEO software application for acknowledging the alert.

Referring back to FIG. 1, the alert center 102 may send location data for LEOs that acknowledged an emergency alert to each of the other LEOs that acknowledged the emergency alert. For example, if the two LEOs within the stationary geofence 104 acknowledged an emergency alert from the alert center 102, each of the LEOs would receive location data for the other LEO. In this way, each LEO that acknowledged the emergency alert (and presumably intends to approach the school) is aware of the location of other LEO(s) that may be approaching the school.

In some embodiments, the LEO software application may utilize the location data received from the alert center 102 and display a location (via the LEO communication device) of each of the LEOs determined to be within the stationary geofence 104 that acknowledged the emergency alert. For example, each LEO communication device may display a map indicating the location of each of the other LEO's that acknowledged the emergency alert.

Additionally, the LEO communication device may output turn-by-turn directions indicating a suitable route to the school having the armed intruder. For example, the LEO communication device may output (e.g., display, audible, etc.) turn-by-turn directions via the LEO software applications disclosed herein or any other suitable software applications in conjunction with or separate from the map explained above.

Similarly, the school personnel SP may receive location data for the school and/or other locations within the stationary geofence 106 from the alert center 102. In this way, the school personnel communication device and/or the LEO communication device may utilize the location data to display a map of the school having an active shooter or any other armed intruder situation. For example, the LEO communication device may display a map detailing rooms, hallways, etc. in the school, the location of the school personnel SP who sent the notification indicating the armed intruder, etc.

The LEO may be notified of an elapsed time from when the notification indicating the armed intruder was sent to the alert center 102. For example, the LEO's communication device may display a counter (e.g., via the LEO software application) tracking the elapsed time from when the notification was received. This enables the LEO to know how long ago the notification was sent thereby providing the LEO an indication of the urgency to acknowledge and respond to emergency alert, etc.

Figure 5A:
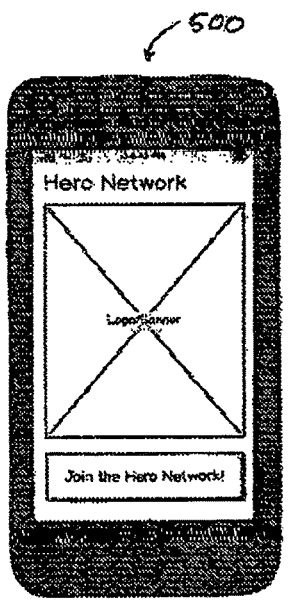
FIGS. 5A-5G are screen shots of an LEO software application having user inputs for an LEO verification process according to another example embodiment.
Figure 5B:
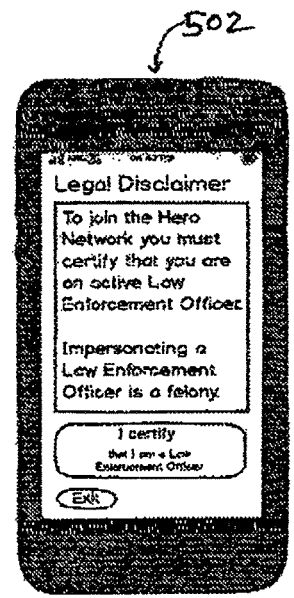
Figure 5C:
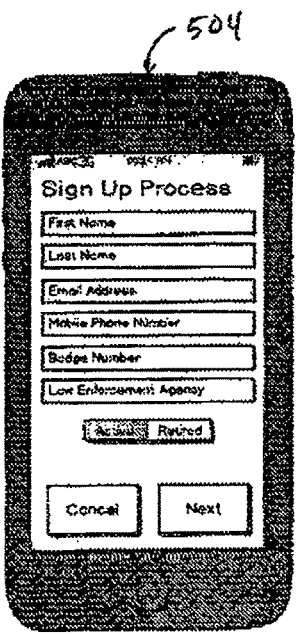
Figure 5D:
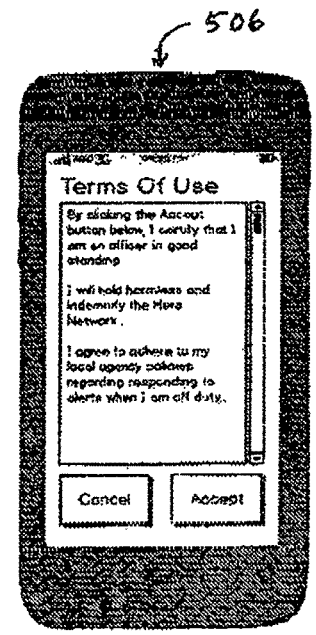
Figure 5E:
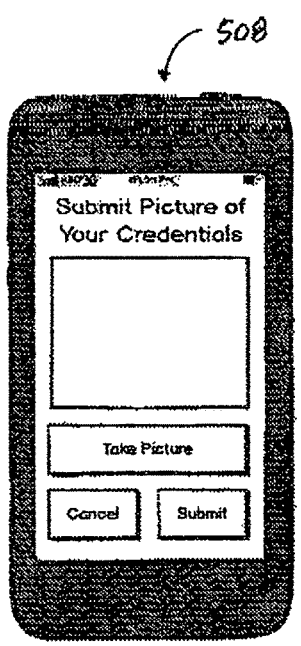
Figure 5F:
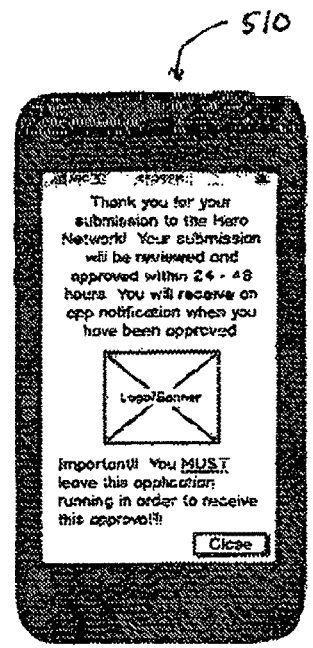
Figure 5G:
Figure 5H:
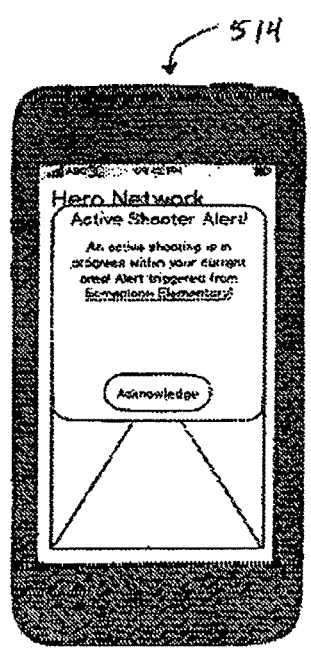
FIG. 5H is a screen shot of an LEO software application displaying an emergency alert according to still another example embodiment.
Figure 5I:
FIG. 5I is a screen shot of an LEO software application displaying a map indicating the location of other LEOs according to another example embodiment.

For example, FIG. 5I illustrates an example screen shot 516 of an LEO software application displaying a map indicating the location of each of the other LEO's that acknowledged the emergency alert as explained above. Additionally, the screen shot 516 displays the elapsed time (e.g., one (1) minute ago) from when the notification indicating the armed intruder was sent to the alert center 102, the number of other LEO's that acknowledged the emergency alert, and the location (e.g., address, etc.) of the school from which the notification was sent.

Referring back to FIG. 1, the alert center 102 may provide (e.g., send) an emergency alert multiple times to LEOs determined to be within the stationary geofence 104. For example, the alert center 102 may provide an emergency alert multiple times to an LEO determined to be within the stationary geofence 104 until the alert is acknowledged by the LEO.

By sending an emergency alert multiple times, the alert center 102 may remind an LEO of an armed intruder situation relatively close to the LEO until the alert is acknowledged by the LEO, send the emergency alert to additional LEOs that may have entered the stationary geofence 104 after a previously sent emergency alert, etc. In some embodiments, the alert center 102 may send an emergency alert once per minute for a period of ten minutes. Alternatively, an emergency alert may be sent at any suitable interval for any suitable period of time.

Additionally, the alert center 102 may notify emergency services in response to receiving the notification indicating the armed intruder situation and/or providing the emergency alert to the LEDs. For example, the alert center 102 may call 911, a police hotline number, etc. in response to receiving the notification and/or providing the emergency alert. Therefore, the alert center 102 may send emergency alert(s) to LEO's within the stationary geofence 104 and school personnel SP within the stationary geofence 106 (as explained above) as well as send a notification indicating an armed intruder to emergency services. In some embodiments, the emergency alerts and the notification may be provided substantially simultaneously.

Additionally and/or alternatively, the school personnel's communication device may notify emergency services (in addition to notifying the alert center 102) in response to user input. For example, the software application may notify (via the communication device) emergency services by autodialing 911, a police hotline number, etc. in response to user input with the software application. Thus, the alert center 102 may send emergency alert(s) to LEO's within the stationary geofence 104 and school personnel SP within the stationary geofence 106 while the school personnel's communication device autodials emergency services.

Figure 4A:
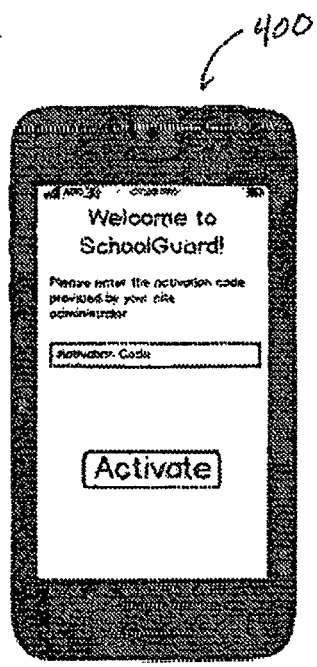
FIGS. 4A-4B are screen shots of a school personnel software application having user inputs for activating the software application according to another example embodiment.
Figure 4B:
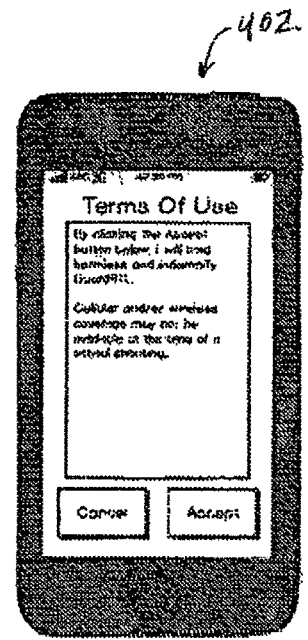
Figure 4C:
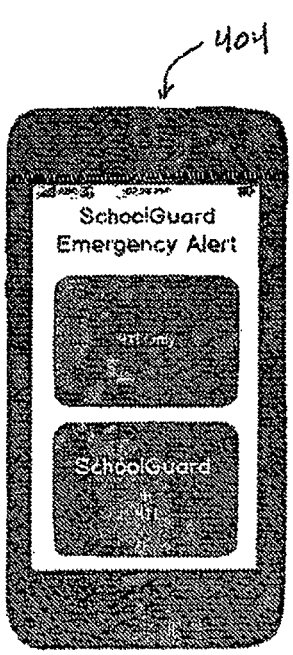
FIGS. 4C-4D are screen shots of a school personnel software application having user inputs for sending a notification indicating an armed intruder according to still another example embodiment.

FIG. 4C shows an example screenshot 404 of a school personnel SP software application displaying a selectable input for notifying an alert center (e.g., the alert center 102 of FIG. 1) of an armed intruder situation and autodialing 911 (e.g., "SchoolGuard+911"). If a school personnel SP selects this input, the communication device may send the notification to the alert center 102 (as explained above) and autodials 911 substantially simultaneously.

Alternatively, the school personnel's communication device may only notify emergency services. For example, as shown in FIG. 4C, the software application displays a selectable input for autodialing 911 (e.g., "911 Only") without sending a notification to the alert center.

Figure 4D:
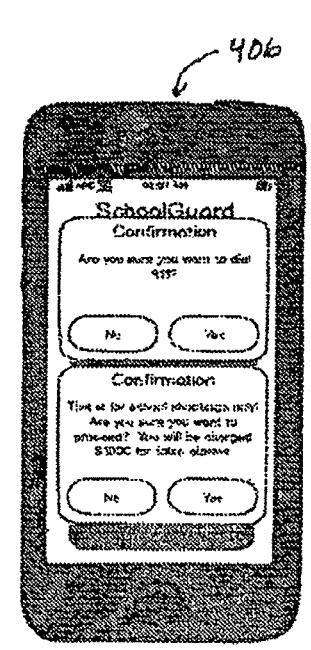

In some embodiments, the software application may display a confirmation request before sending the notification and/or autodialing 911. For example, FIG. 4D illustrates an example screenshot 406 of a school personnel software application displaying a confirmation request and indicating that the school may be charged a fee for false alarms.

Referring back to FIG. 1, the alert center 102 may receive a description of the armed intruder from any one of the school personnel SP. For example, the school personnel SP who notifies the alert center 102 of the armed intruder within the stationary geofence 106 and/or any other school personnel SP who received the emergency alert may provide a description of the armed intruder to the alert center 102.

Figure 5J:
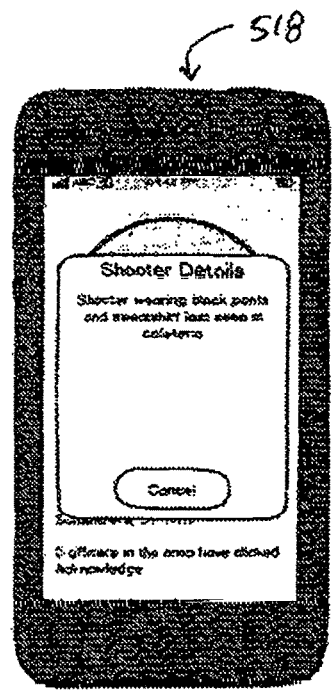
FIG. 5J is a screen shot of an LEO software application displaying a description of an armed intruder according to still another example embodiment.

The alert center 102 may then provide (e.g., send) the description of the armed intruder to the LEO determined to be within the stationary geofence 104. Additionally and/or alternatively, the alert center 102 may provide the description of the armed intruder to emergency services (as explained above) so that it may be passed to other responding emergency agencies. For example, FIG. 5J illustrates an example screen shot 518 of an LEO software application displaying a description of the armed intruder.

Referring back to FIG. 1, the LEO's communication device and/or the school personnel's communication device may include a custom setting. For example, the custom setting may include a vibrate mode, a silent mode, a sleep mode, etc. If the alert center 102 sends an emergency alert as explained above, the LEO software application and/or the school personnel software application may override a custom setting of a communication device in response to receiving the emergency alert. For example, if the LEO communication device is in a silent mode setting, the LEO may not be alerted when the device receives an emergency alert. Thus, the LEO software application may override the silent mode setting when it receives the emergency alert and force the device to output an audible warning, vibrate in a specific pattern, etc. so that the LEO is adequately warned of the emergency alert.

Additionally and/or alternatively, the LEO's communication device and/or the school personnel's communication device may include one or more user functions. For example, the user functions may include calling, messaging, viewing the internet, etc. If the alert center 102 sends the emergency alert, the LEO software application and/or the school personnel software application may interrupt the user function in response to receiving the emergency alert. For example, if an LEO is on a phone call, the LEO may not be alerted when the communication device receives an emergency alert, may simply disregard the alert, etc. Therefore, the LEO software application may interrupt the phone call and warn the LEO of the received emergency alert.

Figure 2:
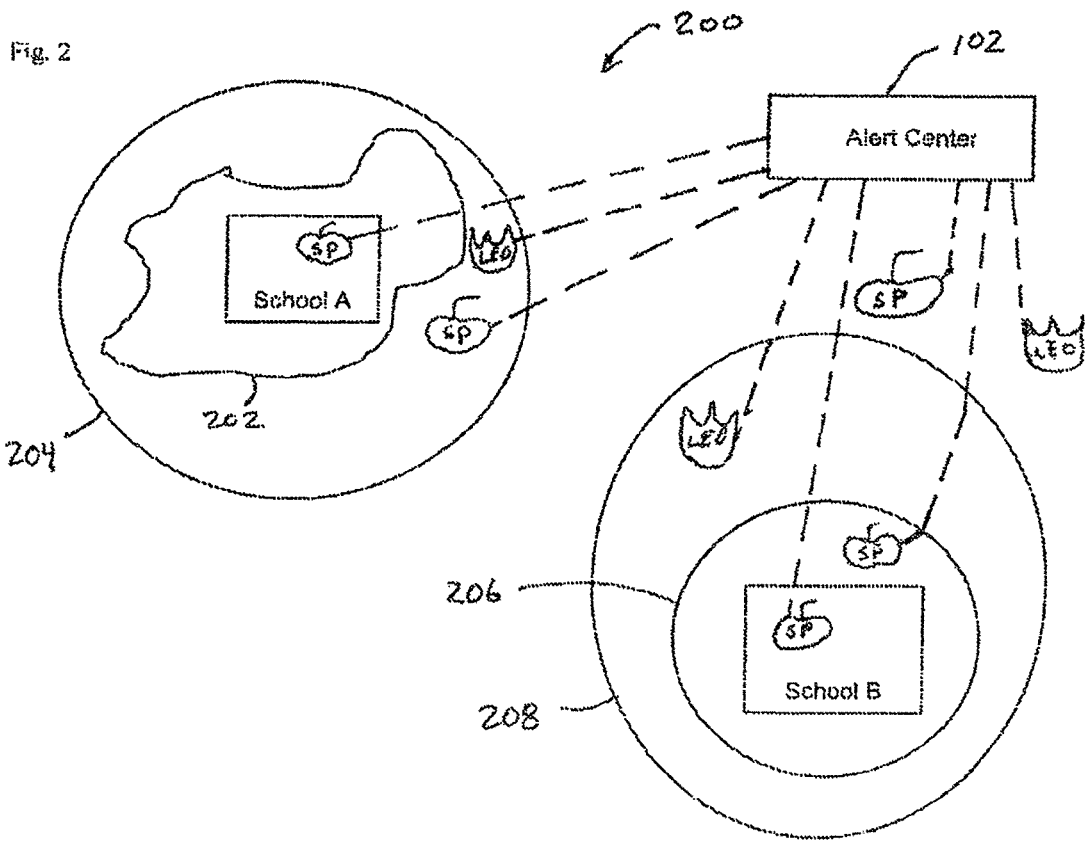
FIG. 2 is a diagram of a system including the alert center of FIG. 1, two stationary geofences encompassing a school, and two other stationary geofences encompassing another school according to another example embodiment.

Additionally, the alert center 102 may manage communications to and/or from school personnel SP and/or LEOs located within different stationary geofences. For example, FIG. 2 illustrates a system 200 including the alert center 102 of FIG. 1, four stationary geofences 202, 204, 206, 208 and two schools A, B. The alert center 102 and/or the communication devices used by the LEOs and/or the school personnel SP of FIG. 2 may include similar features as the alert center 102 and communication devices as described above with reference to FIG. 1.

As shown in FIG. 2, the stationary geofence 204 encompasses the stationary geofence 202 and both geofences 202, 204 encompass the school A. Similarly, the stationary geofence 208 encompasses the stationary geofence 206 and both geofences 206, 208 encompass the school B. Each stationary geofence 202, 204, 206, 208 may be different shapes and/or encompass different geographical areas. Alternatively, some of the stationary geofences 202, 204, 206, 208 may have the same shape and/or encompass common geographical areas (e.g., overlapping geofences).

In the example of FIG. 2, one LEO is within the stationary geofence 204 and one LEO is within the stationary geofence 208. Additionally, two LEOs are outside the stationary geofence 204 and two LEOs are outside the stationary geofence 208. Likewise, one school personnel SP is within the stationary geofence 202 and two school personnel SP are within the stationary geofence 206. Four school personnel SP are outside the stationary geofence 202 and three school personnel SP are outside the stationary geofence 206.

The alert center 102 of FIG. 2 may receive notification(s) from school personnel SP indicating an armed intruder within the stationary geofence 202 and/or notification(s) from school personnel SP indicating an armed intruder within the stationary geofence 204. The alert center 102 may determine whether any LEOs are within the stationary geofence 204 and/or the stationary geofence 208. In response to either notification from the school personnel SP, the alert center 102 may provide an emergency alert to the LEOs determined to be within the stationary geofence 204 and/or the stationary geofence 208.

Because the alert center 102 is able to manage communications to and/or from school personnel SP and/or LEOs located within different stationary geofences, the system 200 is not location specific. For example, an LEO may be traveling across the country on vacation and enter and exit multiple geofences during this time. If the LEO is within the stationary geofence 204 (e.g., located in Missouri) when the alert center 102 is notified of an armed intruder within the stationary geofence 202 (e.g., a protection zone), the alert center 102 provides an emergency alert to the LEO corresponding to the notification. Additionally and/or alternatively, that same LEO may later be within the stationary geofence 208 (e.g., located in Florida). If the alert center 102 is notified of an armed intruder within the stationary geofence 206 (e.g., a different protection zone) while the LEO is within the stationary geofence 208, the alert center 102 provides an emergency alert to the LEO corresponding to the notification. Accordingly, one LEO may receive one emergency alert while in one geographical area and receive another emergency alert while in another geographical area.

The alert center 102 of FIGS. 1 and/or 2 may include a computer server (e.g., as shown in FIG. 1) to perform any one of the alert center features disclosed herein. Although FIG. 1 illustrates one computer server, it should be apparent to those skilled in the art that the alert center 102 may include more than one computer server to perform the alert center features.

For example, the computer server of FIG. 1 may include memory for storing computer-readable instructions for performing the methods described above and processor(s) for executing the computer-readable instructions. Additionally and/or alternatively, the computer-readable instructions for performing the methods may be stored on a non-transitory computer-readable medium including, for example, disks, SD cards, DVD, CD-ROMs, ROMs, RAMs, EPROMs, EEPROMs, DRAMs, VRAMs, flash memory devices, or any other suitable medium for storing instructions.

Figure 3:
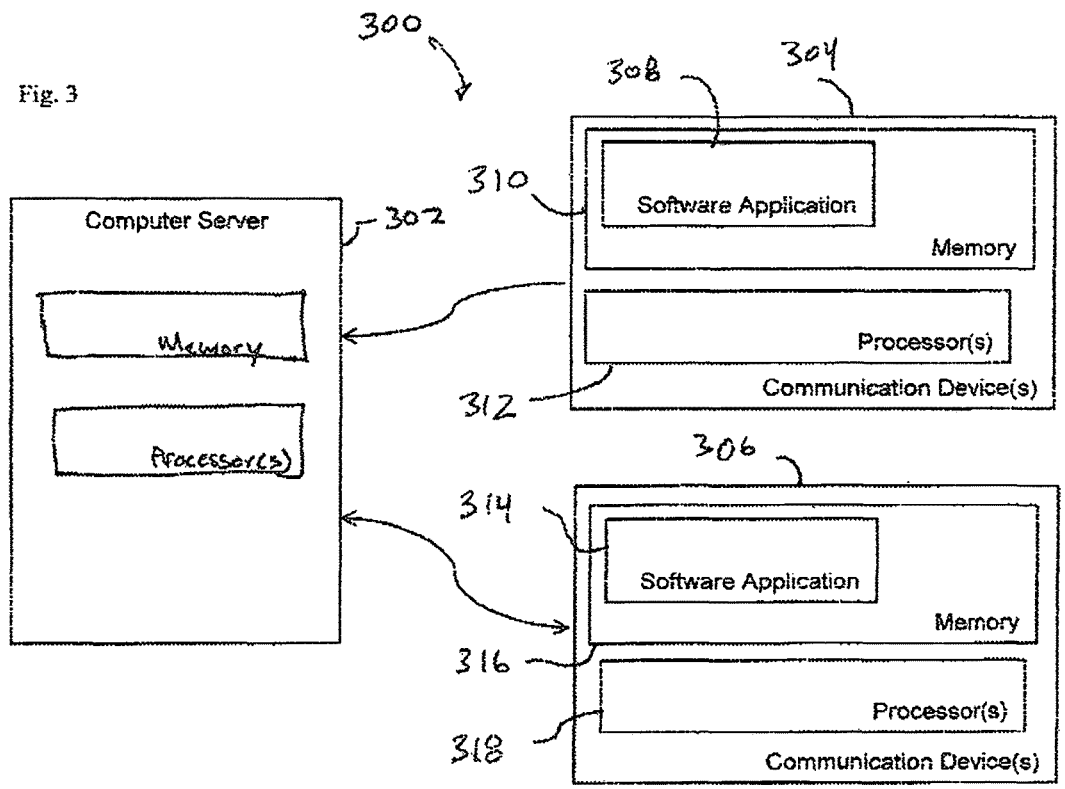
FIG. 3 is a block diagram of a system including a computer and multiple communication devices according to still another example embodiment.

FIG. 3 illustrates another example computer server that may be employed to perform any one of the alert center features explained herein. As shown in FIG. 3, an example system 300 includes the computer server 302 and communication devices 304, 306. The communication device 304 may be any of the school personnel's communication devices disclosed herein while the communication device 306 may be any of the LEO's communication device disclosed herein. Each communication device 304, 306 includes memory 310, 316, one or more processors 312, 318, and a software application 308, 314 stored in its respective memory 310, 316 for execution by its respective processors 312, 318.

In some embodiments, the LEO software application 314 is provided only to LEOs. Thus, only LEOs may be grouped together to form an LEO network (e.g., a "Hero Network").

In order to join the LEO network, an LEO may be required to follow a verification process. For example, FIGS. 5A-5G illustrate example screen shots of a LEO software application (e.g., the software application 314) allowing an LEO to join an LEO network. The LEO may select an input of the LEO software application to join the LEO network as shown in the screen shot 500 of FIG. 5A. Once the LEO certifies he/she is an actual LEO via the software application (e.g., screen shot 502 of FIG. 53), the LEO may enter personally identifiable information on the communication device and agree to the terms of USA as shown in the screen shot 504 of FIG. 5C and the screen shot 506 of FIG. 5D, respectively.

As shown in the screen shot 508 of FIG. 5E, the LEO may submit his/her credentials via the LEO software application (or by any other suitable manner) for verification. For example, the LEO may capture a digital photograph of his/her credentials and then send the digital photograph via the LEO's communication device to a computer server (e.g., the computer server 302). This allows an administrator of the system and/or the computer server to verify the credentials of the LEO and, in response, activate the software application for the LEO.

As shown in the screen shot 510 of FIG. 5F, the LEO software application may notify the LEO of the verification process after the LEO submits his/her credentials. After the LEO is verified, the software application may indicate to the LEO that he/she has been accepted to join the LEO network (e.g., as shown in screen shot 512 of FIG. 5G).

A school (e.g., school administrator(s)) may setup, modify, etc. a stationary geofence, the school personnel SP who may have access to school personnel software application, etc. For example, an Internet website including a user interface may be provided to allow school administrator to sign up for an account, setup a stationary geofence about a school, log in to an existing account, etc.

Figure 7A:
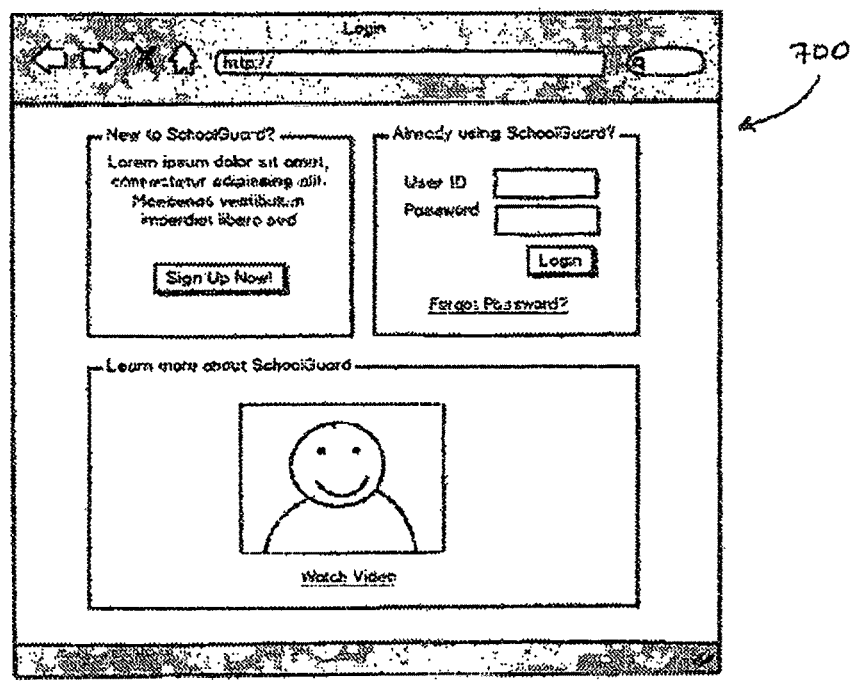
FIGS. 7A-7C are screen shots of user interfaces allowing one or more school administrators to log in to an account, retrieve a password, and view and/or edit various parameters according to another example embodiment.

One example user interface 700 is shown in FIG. 7A. As shown in FIG. 7A, the user interface 700 displays one or more options to create a new account, log in to an existing account, select if the school administrator forgot a password, and view an informational video about the system.

Figure 7B:
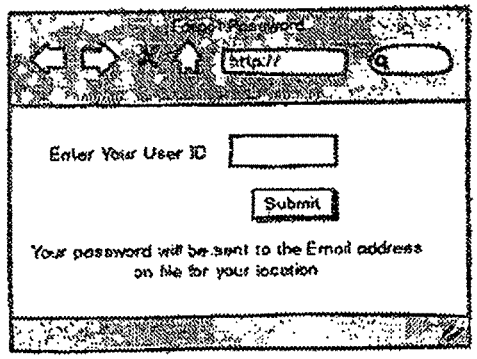

FIG. 7B illustrates an example screen shot of a user interface 702 displayed when the school administrator selects the "Forgot Password" option of the user interface 700 of FIG. 7A. As shown in FIG. 7B, the school administrator may enter a particular user identification to retrieve the password.

Figure 7C:
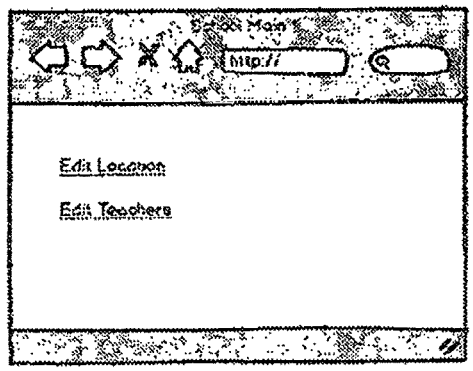

FIG. 7C illustrates an example screen shot of a user interface 704 displaying options for the school administrator to edit a particular location (e.g., a stationary geofence) and edit a list of teachers (e.g., school personnel SP) who may receive the school personnel software application. The user interface 704 may be displayed after the school administrator successfully logged in to the existing account on the user interface 700 of FIG. 7A.

FIG. 8 illustrates an example screen shot of a user interface 800 displaying selectable options by system administrator(s). As shown in FIG. 8, the selectable options allow the system administrator to edit the location of the stationary geofence, edit a list of teachers (e.g., school personnel SP) who may receive the school personnel software application, and view LEOs.

FIGS. 9A and 9B illustrate example screen shot of user interfaces 900, 902. The user interface 900 allows the system administrator to view and edit existing locations, search for existing locations, etc. The user interface 900 may be displayed after the system administrator selects the option to edit locations on the user interface 800 of FIG. 8.

The user interface 902 allows the system administrator and/or the school administrator to setup a new geofence for a location and/or modify an existing geofence. As shown in FIG. 9B, the system administrator and/or the school administrator may enter and/or modify personally identifiable information (e.g., name, address, etc.), enter a radius for a stationary geofence, enter credit card information, etc. Additionally, the user interface 902 provides an option for the system administrator to test the system including the defined stationary geofence and/or the software application provided to the school personnel SP.

FIG. 10A illustrates an example screen shot of a user interface 1000 that allows the system administrator and/or the school administrator to search and/or select a particular location and then view and/or edit particular school personnel SP who have access to the software application associated with that location. In the example of FIG. 10A, the option to select a particular location and/or to view that location may be accessible only by the system administrator. Additionally, the user interface 1000 allows the system administrator and/or the school administrator to view whether a teacher (or another school personnel SP) is selected to receive an emergency alert while outside a particular stationary geofence.

The user interface 1000 may also display a selectable option to add a teacher (e.g., or another school personnel SP) to the system. For example, FIG. 10B illustrates an example screen shot of a user interface 1002 that may be displayed after the system administrator and/or the school administrator has selected the option to add a teacher on the user interface 1000 of FIG. 10A. As shown in FIG. 10B, the user interface 1002 displays options to enter a name of the teacher, generate an activation code for the teacher, inactivate the teacher from the system, allow the teacher to receive an emergency alert outside the stationary geofence, etc.

In some embodiments, the activation code may be required to activate the school personnel software application. For example, FIG. 4A illustrates an example screenshot 400 of a software application displaying an option to input an activation code generated when a new teacher is added to the system. Once the teacher enters the activation code associated with his/her profile, the software application may display terms of use associated with the software application (see, e.g., example screenshot 402 of FIG. 4B). In this way, the software application for the school personnel's communication device may be activated only by school personnel associated with that school.

Figure 11A:
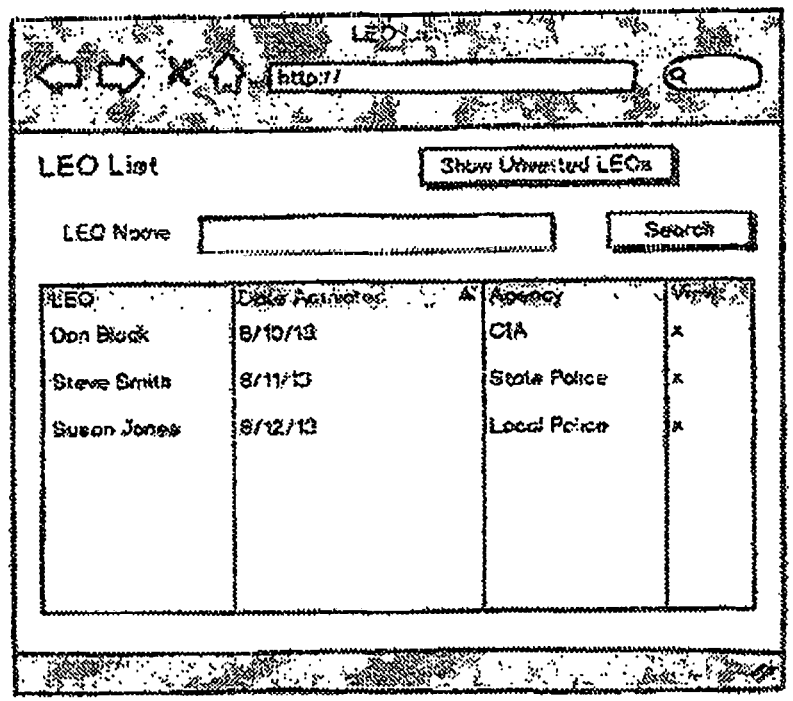
FIGS. 11A-11B are screen shots of user interfaces allowing one or more system administrators to view and/or edit the list of LEOs in an LEO network according to still another example embodiment.

FIG. 11A illustrates an example screen shot of a user interface 1100 that allows the system administrator to search and/or select a particular LEO to view. For example, as shown in FIG. 11A, the system administrator may view a name of a particular LEO, the date the LEO was activated on the system, a particular agency (e.g., federal police, state police, local police, etc.) the LEO is affiliated with, etc.

Figure 11B:
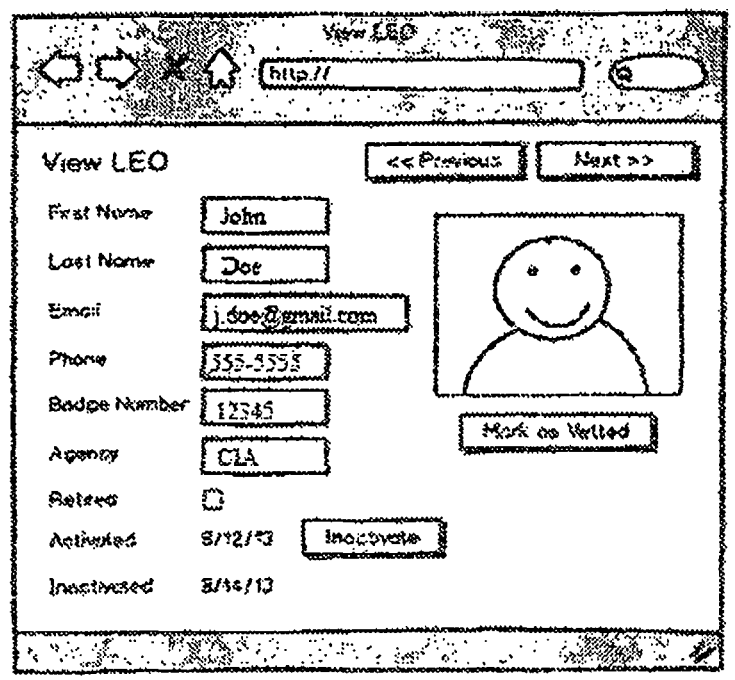

FIG. 11B illustrates an example screen shot of a user interface 1102 that allows the system administrator to view an LEO profile. For example, as shown in FIG. 11B, the user interface 1102 allows the system administrator to view personally identifiable information (e.g., name, address, badge number, department serial number, agency, status, etc.) of the LEO, inactivate the LEO from the system, etc. Additionally, the system administrator may mark a particular LEO as vetted if the LEO is verified as explained above.

In the example of FIG. 11B, the school administrator does not manage the LEO accounts. This allows the system administrator (or other appropriate authorities), and not the school administrator, to define a network of LEOs that are provided an emergency alert corresponding to an armed intruder in any one of the stationary geofences (e.g., protection zones) as explained above.

Figure 12:
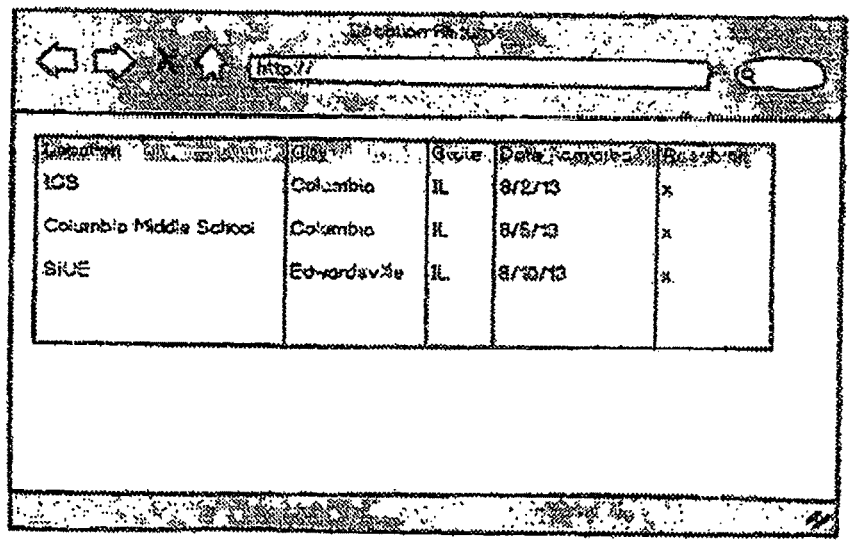
FIG. 12 is a screen shot of a user interface allowing one or more system administrators to view particular schools that have not made a payment for services according to another example embodiment.

FIG. 12 illustrates another example screen shot of a user interface 1200 displaying a list of locations (e.g., Immaculate Conception School (ICS), Columbia Middle School, Southern Illinois University Edwardsville (SIUE), etc.) encompassed by a particular stationary geofence, a city/state for each location, the date when each location was activated, etc.

Additionally, the user interface 1200 may allow the system administrator to view particular schools that have missed a payment and whether the invoice for payment was resubmitted. For example, a school may use a credit card for payment. The school, however, may have changed credit card numbers, cancelled the credit card, etc. without notifying the system administrator. If the credit card payment fails, the user interface 1200 allows the system administrator to resubmit payment.

Figure 13:
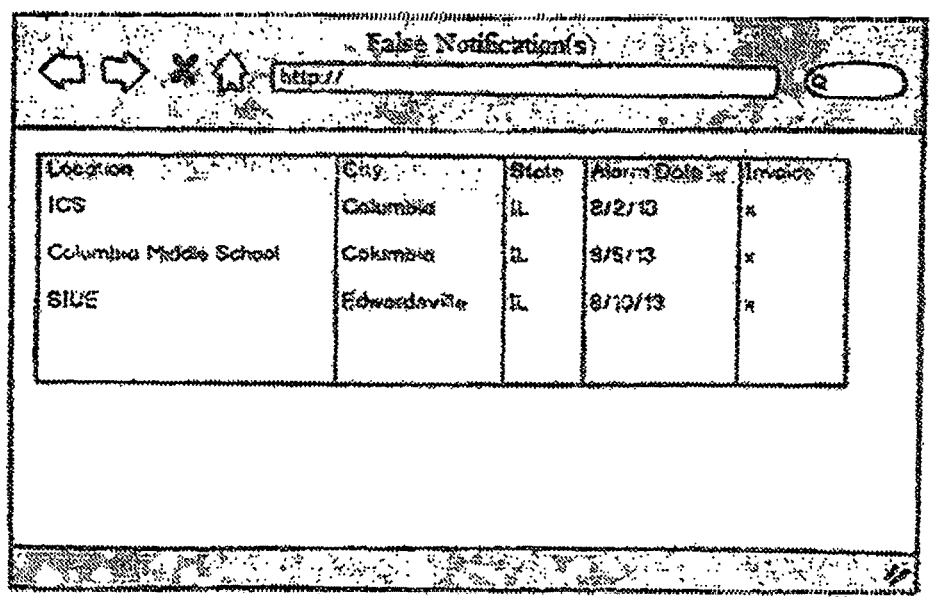
FIG. 13 is a screen shot of a user interface allowing one or more system administrators to view false notifications by location according to another example embodiment.

FIG. 13 illustrates an example screen shot of a user interface 1300 indicating a false alarm for a location. For example, the school personnel SP may send a mistaken, inadvertent, etc. notification indicating an armed intruder situation at a location. In such a case, the user interface 1300 displays the location of the false alarm, a city/state for each location, the alarm date, etc.

Additionally, as shown in FIG. 13, the user interface 1300 may indicate whether an invoice was sent to the school, paid by the school, etc. For example, the system administrator may send an invoice to the school for a false alarm (if appropriate). In some embodiments, once the invoice is paid (e.g., with the school's credit card, etc.), the system administrator may indicate on the user interface 1300 that payment was received.

As disclosed herein, an LEO may be any agent, employee, etc. of a government (e.g., federal, state, local including municipality, county, etc.), a reservation (e.g., Indian reservation, etc.), etc. who is legally authorized to carry a weapon. The LEO may be on-duty, off-duty, retired, etc. For example, LEOs may include federal police (e.g., CIA agents, FBI agents, secret service agents, ATF agents, border patrol, etc.), non-federal police (e.g., state, local, county, etc.), tribal agents, etc.

The communication devices disclosed herein may include any suitable communication device able to communicate via a communication network including, for example, smartphones, tablet computers, etc. Additionally, the communication devices may be mobile, fixed to a wall (or other structures), etc. For example, a communication device may be fixed (permanently or temporarily) to a wall in a school and accessible by appropriate school personnel SP.

The LEO software applications and/or the school personnel software applications disclosed herein may be a mobile software application suitable for a communication device as described above. The software applications may be downloaded from an online application store including iTunes®, Android Market, etc. or any other suitable application store.

Additionally, the communication(s) between the communication devices and the computer server(s), the alert centers, etc. may be a direct communication. For example, an LEO may communicate directly with a computer server via the software application of the LEO's communication device. Alternatively, the communication(s) between the communication devices and the computer server(s), the alert centers, etc. may not be a direct communication.

Further, the emergency alerts disclosed herein for the LEOs and the school personnel SP may be the same emergency alert or different emergency alerts.

The stationary geofences disclosed herein may be a virtual perimeter for a geographic area. The stationary geofences may be any suitable shape (e.g., symmetrical or nonsymmetrical) including, for example, a circle, an oval, a square or any other polygon shape, etc. For example, a stationary geofence may cover only the school building, cover a user defined radius about the school building, etc.

Additionally, the stationary geofences may include a geographic area in multiple states (e.g., bordering states), counties, etc. For example, a virtual perimeter of a stationary geofence may extend into Missouri and Kansas.

The stationary geofences may be created by global positioning coordinates based on global positioning systems (GPS). For example, the stationary geofences may be established by latitude(s), longitude(s), altitude(s), and/or a radius around a fixed location. Alternatively, the stationary geofences may be created by any other suitable mapping technique.

Although the FIGS. 1 and 2 illustrate a stationary geofence encompassing a school and communications devices used by school personnel, any one of the stationary geofences may encompass any other suitable premises including, for example, a theater, a church, a park, etc. and any one of the communication devices may be used by personnel associated with that premises. For example, the stationary geofence 202 may encompass a church while the stationary geofence 206 may encompass a theater.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A computer-implemented method executed by one or more computer servers, the method comprising:
receiving a notification from a first communication device, the notification indicating an armed intruder within a first stationary geofence, said notification made in response to input from a first user; and
determining whether said first communication device is within said first stationary geofence;
wherein the notification is ignored if the first communication device is determined to be outside the first stationary geofence; and
wherein the following additional steps are performed only if the first communication device is determined to be within the first stationary geofence:
automatically determining whether one or more of a second plurality of communication devices are within a second stationary geofence different than the first stationary geofence;
in response to the notification, automatically providing an emergency alert to one or more of the second plurality of communication devices the communication device(s) determined to be within the second stationary geofence;
receiving an acknowledgement from at least one of the second plurality of communications devices in response to input from a second user; and
automatically displaying information related to the notification on the device which sent the acknowledgement as soon as such information becomes available.

2. The method of claim 1 wherein the second plurality of communication devices each comprise a software application provided to one or more law enforcement officers (LEDs).

3. The method if claim 2, wherein the method further comprises the step of: verifying credentials of a LEO, and, in response to the verifying, activating the software application for the LEO.

4. The method of claim 3 wherein the step of providing the emergency alert includes providing the emergency alert to one or more of the second plurality of communication devices determined to be within the secondary geofence irrespective of whether the associated LEOs are on-duty.

5. The method of claim 1, where in the method further comprises the steps of:
determining whether one or more of a third plurality of communication devices are within the first stationary geofence; and,
Providing an emergency alert to the-one or more of the third plurality of communication devices determined to be within the first stationary geofence.

6. The method of claim 5 wherein the first stationary geofence encompasses a premises and further wherein the third plurality of communication devices each comprise a software application software application provided only to personnel associated with said premises.

7. The method of claim 6, wherein the second stationary geofence encompasses the first stationary geofence.

8. The method of claim 6, wherein the premises includes a school and the personnel associated with the premises include school personnel.

9. The method of claim 1, wherein the method further comprises the step of: notifying emergency services in response to receiving the notification indicating the armed intruder.

10. The method of claim 1, wherein the method further comprises the step of: receiving from the first communication device a description of the armed intruder.

11. The method of claim 10, wherein the information includes the description of the armed.

12. The method of claim 1, wherein the step of providing the emergency alert includes providing the emergency alert a plurality of times.

13. The method of claim 1, wherein the first communication device is a smartphone.

14. The method of claim 2, wherein the software application is installed on a smartphone.

15. The method of claim 6, wherein the software application is installed on a smartphone.

16. The method of claim 1 comprising the step of receiving an acknowledgement from a plurality of communication devices in response to input from a plurality of users.

17. The method of claim 1 wherein the information includes the real-time location of each of the second plurality of communication devices that have sent an acknowledgement.

18. The method of claim 1 wherein the information displayed includes a map of the area in which the armed intruder is believed to be.

19. The method of claim 1 wherein the information displayed includes the location of the communication device that sent the notification.

* * * * *